United States Patent
Auad (12) 
(10) Patent No.: US 6,637,926 B1
(45) Date of Patent: Oct. 28, 2003

(54) FLUID MIXING DEVICE AND FLUID INJECTION VALVE FOR USE THEREWITH

(75) Inventor: Rogerio Batista Auad, Porto Alegre (BR)

(73) Assignee: Renner Herrmann S.A., Porto Alegre (BR)

( * ) Notice: Subject to any disclaimer, the term of this patent is extended or adjusted under 35 U.S.C. 154(b) by 0 days.

(21) Appl. No.: 09/743,613

(22) PCT Filed: Jul. 16, 1998

(86) PCT No.: PCT/BR98/00048

§ 371 (c)(1),
(2), (4) Date: Apr. 23, 2001

(87) PCT Pub. No.: WO00/03578

PCT Pub. Date: Jan. 27, 2000

(51) Int. Cl.[7] .................................................. B01F 7/00
(52) U.S. Cl. ............................... 366/168.1; 366/181.4; 366/279
(58) Field of Search .............................. 366/168.1, 279, 366/178.2, 177.1, 181.4, 178.3

(56) References Cited

U.S. PATENT DOCUMENTS

| | | | | |
|---|---|---|---|---|
| 1,987,944 A | * | 1/1935 | Rafton | 366/176.2 |
| 1,993,762 A | * | 3/1935 | Tolman | 366/159.1 |
| 1,997,032 A | * | 4/1935 | Alstad et al. | 366/157.2 |
| 2,313,760 A | * | 3/1943 | McLean | 366/286 |
| 3,658,266 A | * | 4/1972 | O'Keefe et al. | 366/305 |
| 3,744,763 A | * | 7/1973 | Schnoring et al. | 366/178.1 |
| 4,213,712 A | | 7/1980 | Aanonsen et al. | 366/178 |
| 4,314,963 A | * | 2/1982 | Boden et al. | 264/328.6 |
| 4,834,545 A | * | 5/1989 | Inoue et al. | 222/135 |
| 5,174,327 A | | 12/1992 | Truax et al. | 137/469 |
| 5,366,288 A | * | 11/1994 | Dahllof et al. | 366/176.2 |
| 5,902,042 A | * | 5/1999 | Imaizumi et al. | 366/176.2 |

FOREIGN PATENT DOCUMENTS

| | | |
|---|---|---|
| EP | 0 734 761 | 10/1996 |
| GB | 197159 | 5/1923 |
| GB | 1 266 511 | 3/1972 |
| GB | 2 248 406 | 4/1992 |
| JP | 10029213 A * | 2/1998 |
| WO | WO 94/11096 | 5/1994 |
| WO | WO 99/48602 | 9/1999 |

* cited by examiner

*Primary Examiner*—Tony G. Soohoo
(74) *Attorney, Agent, or Firm*—Smith, Gambrell & Russell (57) ABSTRACT

A fluid mixing device, for the continuous mixing of two or more fluids, having a mixing chamber which has fluid contact surfaces defining an internal chamber region, a fluid inlet, for feeding fluid into the chamber region, a fluid outlet, for feeding fluid out of the chamber region, and a fluid mixer within the chamber region which is capable of inducing mixing of two or more fluids within a mixing region. The mixing chamber is configured so that the dead volume within the chamber region is filled in such a way that the mixing region corresponds to the chamber region. A fluid inlet valve for use in the fluid mixing device has entrance and exit aperture sealing means which are adapted to allow passage of fluid respectively into and out of a body portion of the valve, according to a specified pressure differential between the pressure externally of the entrance aperture and the pressure externally of the exit aperture.

11 Claims, 6 Drawing Sheets

FLUID MIXING DEVICE AND FLUID INJECTION VALVE FOR USE THEREWITH

TECHNICAL FIELD

The present invention relates to an apparatus for rapidly mixing together exactly specified quantities of two or more fluids such as paints, enamels and dyes amongst others to form a homogenised fluid mixture.

BACKGROUND ART

In general, modem day paint manufacturing processes utilise a set of pigment pastes or concentrates which are mixed together with specified amounts of a white, black or green base paint to produce the desired colour and are diluted by adding specified amounts of solvent or varnish to obtain the required viscosity. In this way, a paint with specified physical properties such as colour, opacity, hue, saturation and viscosity can be obtained.

Typically, the time taken to produce a batch of paint is lengthy due to the lack of uniformity between different batches of concentrates and bases, and the subsequent need for an iterative process of testing and adjustment before the desired result is achieved. In most paint manufacturing processes such an iterative process was extremely time consuming, taking of the order of days for the required quantities of concentrates and bases to be determined. However, due to recent advances in paint production techniques, measurement of the physical properties of a paint mixture can be achieved in a matter of seconds, as described in PCT/BR96/00046. This has meant that analysis of the properties of a paint mixture is no longer the most time consuming step in the process of paint manufacture, and, in order to speed up the process still further, attention has needed to be focused on other steps in the process.

One of the steps in the paint manufacturing process that is relatively time consuming is the mixing of the various ingredients or components of the desired paint formula to be produced. This must be done so as to achieve a homogenous mixture of exact and repeatable quantities of the various ingredients in as little time as possible.

Mixing of the various components of a paint formula usually takes place in a mixing vessel such as a vat or barrel into which each of the components is poured and then mixed.

In order to enable mixing of the components, the mixing vessel must have a large enough volume to allow all the components of the formula to be added.

Addition of the components can be carried out using any one of three basic dosing systems:

(a) Gravimetric Dosing

In this system, the vessel is mounted on a weighing structure which is used to weigh the formula to which each component is dosed gravametrically in sequence.

(b) Volumetric Dosing

In this system, each component to be dosed has an individual dosing system which provides the correct dosage for each of the components to the mixing vessel. Normally, dosing pumps are used for this purpose, these having the inconvenience of requiring periodic calibration. The principal advantage of a volumetric dosing system over a gravimetric dosing system is the speed with which the components can be added to the vessel, since all the components can be added simultaneously. The volumetric dosing system is used to a great extent in commercial dosing machines.

(c) Simultaneous Dosing Controlled by Flow Rate Meters

This system brings together the individual advantages of each of the systems described above (precision and speed), because the dosing is controlled individually for each component using a mass flow rate meter. Coriolis effect mass flow rate meters provide the best solution for this type of dosing because they directly measure the variable mass and not volume, as do other meters. Measurement and control of the dosing using volumetric flow rate meters is affected by variations in density, temperature, etc.

In the dosing systems described in items (b) and (c) above, each of the various components of the paint formula to be dosed typically is injected into the vessel through an injection nozzle. This presents a problem with respect to the reliability of the dosing system, since it is difficult to control exactly the quantities of each of the components entering the mixing vessel, there being the possibility of spitting from the nozzles during injection as well as suck back of partially mixed paint ingredients, immediately after injection, and dripping from the nozzles during mixing.

After the components of the paint formula have been added to the mixing vessel, it is necessary to homogenise (mix) the components of the formula, and the time taken to mix the components may take from minutes to hours, depending directly on such factors as the volume of the vessel in which the components are mixed, the pumping capacity of the mixing impeller, as well as the individual differences in viscosity between the components of the formula. It should also be noted that during mixing or homogenisation of the various components of the paint formula the composition of the mixture may alter due to evaporation of the solvents used, since normally the mixing vessels are open.

Object of the Invention

The object of the present invention is to provide a fluid mixing device, and fluid injection valve for use therewith, for rapidly and continuously mixing together exactly specified quantities of two or more fluids, which overcome the above mentioned problems in the state of the art.

SUMMARY OF THE INVENTION

According to a first aspect of the present invention, a fluid mixing device, for the continuous mixing of two or more fluids, comprises:

- a mixing chamber having fluid contact surface means defining an internal chamber region;
- at least one fluid inlet means provided in the fluid contact surface means, for feeding at least one fluid into the chamber region;
- at least one fluid outlet means provided in the fluid contact surface means, for feeding fluid out of the chamber region;
- fluid mixing means within the chamber region, capable of inducing mixing of two or more fluids within a mixing region;
- wherein the chamber region has a configuration which substantially corresponds to the configuration of the mixing region.

The mixing chamber comprises an outer fluid containment portion and an inner core, a first area of the fluid contact surface means being formed on the fluid containment portion and a second area of the fluid contact surface means being formed on the inner core.

For preference, the first area of the fluid contact surface means has a substantially spherical form, and at least one of the fluid inlet means is provided in this area.

Preferably, at least one of the fluid outlet means is also provided in the first area of fluid contact surface means, and at least one of the fluid inlet means is located below this outlet means.

For further preference, the mixing chamber is further provided with pressure control means, for controlling the pressure within the chamber region in relation to the pressure externally of the chamber.

According to a second aspect of the present invention, a valve means for use in the fluid mixing device according to the first aspect of the present invention, comprises:

- a body portion having at least one fluid entrance aperture, for allowing fluid to flow into the body portion;
- a fluid exit aperture, for allowing fluid to flow from the body portion;
- entrance aperture sealing means having biasing means for biasing the entrance aperture sealing means into a sealing position in which the fluid entrance aperture is sealed; and
- exit aperture sealing means having biasing means for biasing the exit aperture sealing means into a sealing position in which the fluid exit aperture is sealed;
- wherein the entrance and exit aperture sealing means are adapted to allow passage of fluid respectively into and out of the body portion, according to a specified pressure differential between the pressure externally of the entrance aperture and the pressure externally of the exit aperture.

BRIEF DESCRIPTION OF THE DRAWINGS

The present invention will now be described in greater detail, by way of example, with reference to the accompanying drawings, in which:

FIG. 5(*a*). shows one configuration of an impeller for use in the mixing unit of the mixing device according to the present invention;

FIG. 5(*b*) shows another configuration of an impeller for use in the mixing unit of the mixing device according to the present invention;

FIG. 5(*c*) shows a further configuration of an impeller for use in the mixing unit of the mixing device according to the present invention;

FIG. 5(*d*) shows yet another configuration of an impeller for use in the mixing unit of the mixing device according to the present invention;

FIG. 5(*e*) shows the preferred configuration of an impeller for use in the mixing unit of the mixing device according to the present invention;

FIG. 5(*f*) shows another configuration of an impeller for use in the mixing unit of the mixing device according to the present invention;

DETAILED DESCRIPTION OF THE INVENTION

Figure 1:
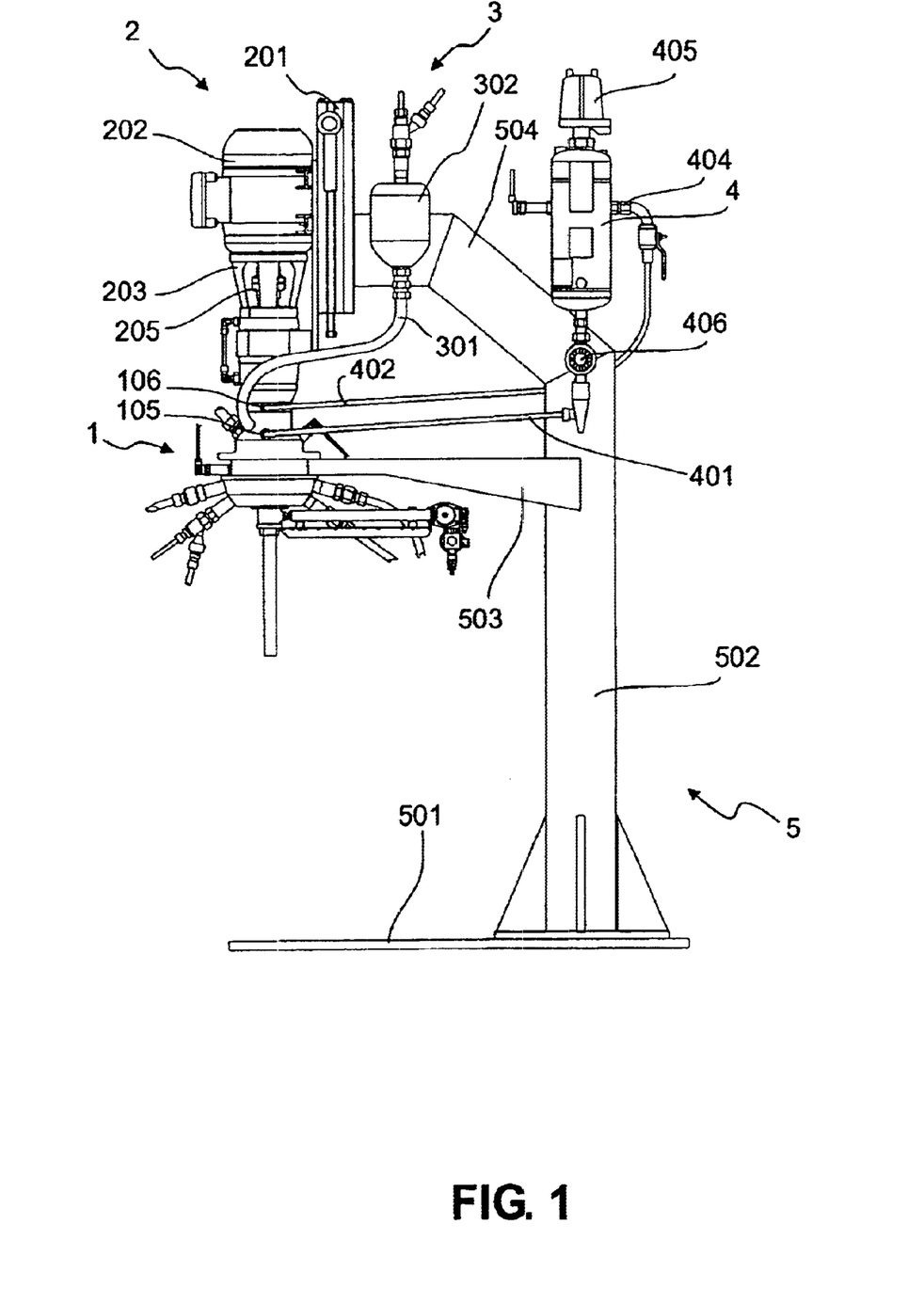
FIG. 1 shows a partial sectional diagram of a fluid mixing device according to the present invention, including a mixing unit, motor unit, damper unit, thermo-siphon unit and support unit.

Referring first to FIG. 1 of the drawings, a fluid mixing device, according to the presently preferred embodiment of this invention, comprises a fluid mixing unit 1 connected to a motor unit 2, to a hydraulic damper unit 3 and to a thermo-siphon unit 4. Each of units 1 to 4 is supported on a support unit 5 which comprises a base-plate 501, to which a vertical stand 502 is attached. A support 503 extends horizontally from stand 502 and is attached to mixing unit 1. Thermo-siphon unit 4 is connected to the upper end of stand 502, and a motor support 504 also extends therefrom. Hydraulic damper unit 3 is attached to motor support 504 which is connected to motor unit 2 by a vertically slidable motor carriage 201.

Figure 2:
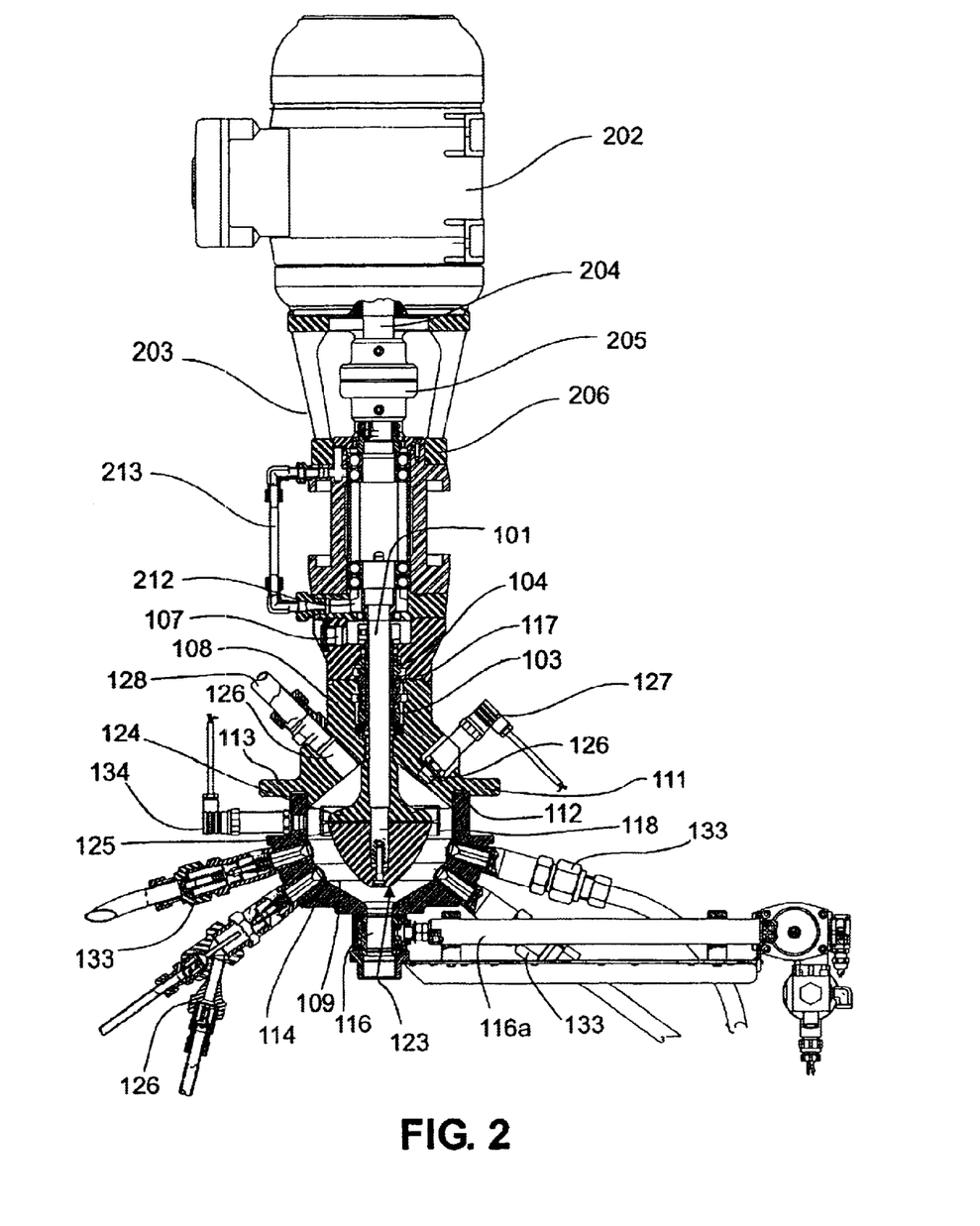
FIG. 2 shows a sectional diagram of the fluid mixing device according to the present invention, including details of the mixing and motor units.
Figure 3:
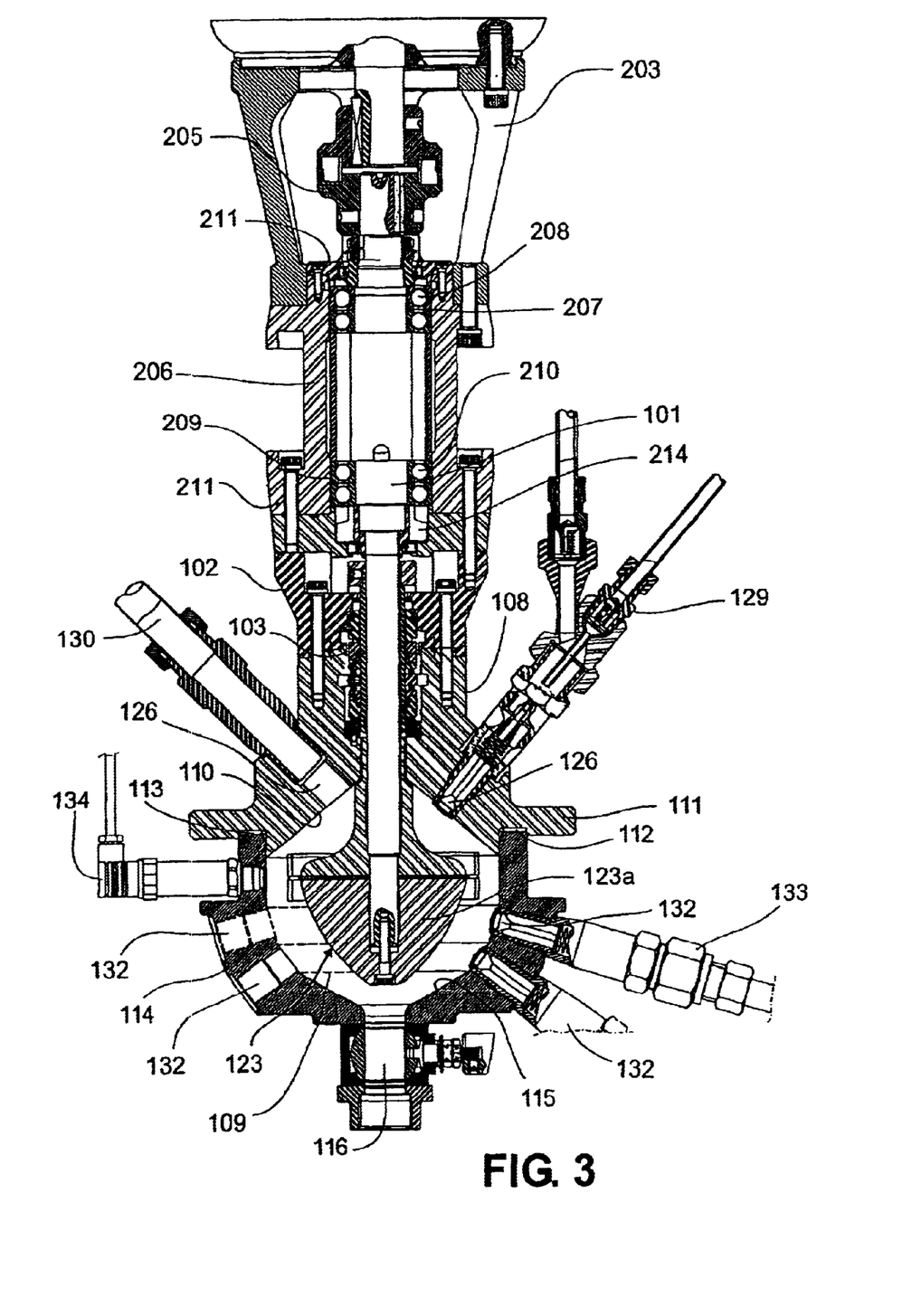
FIG. 3 shows a sectional diagram of the fluid mixing device, including details of the mixing unit.
Figure 4:
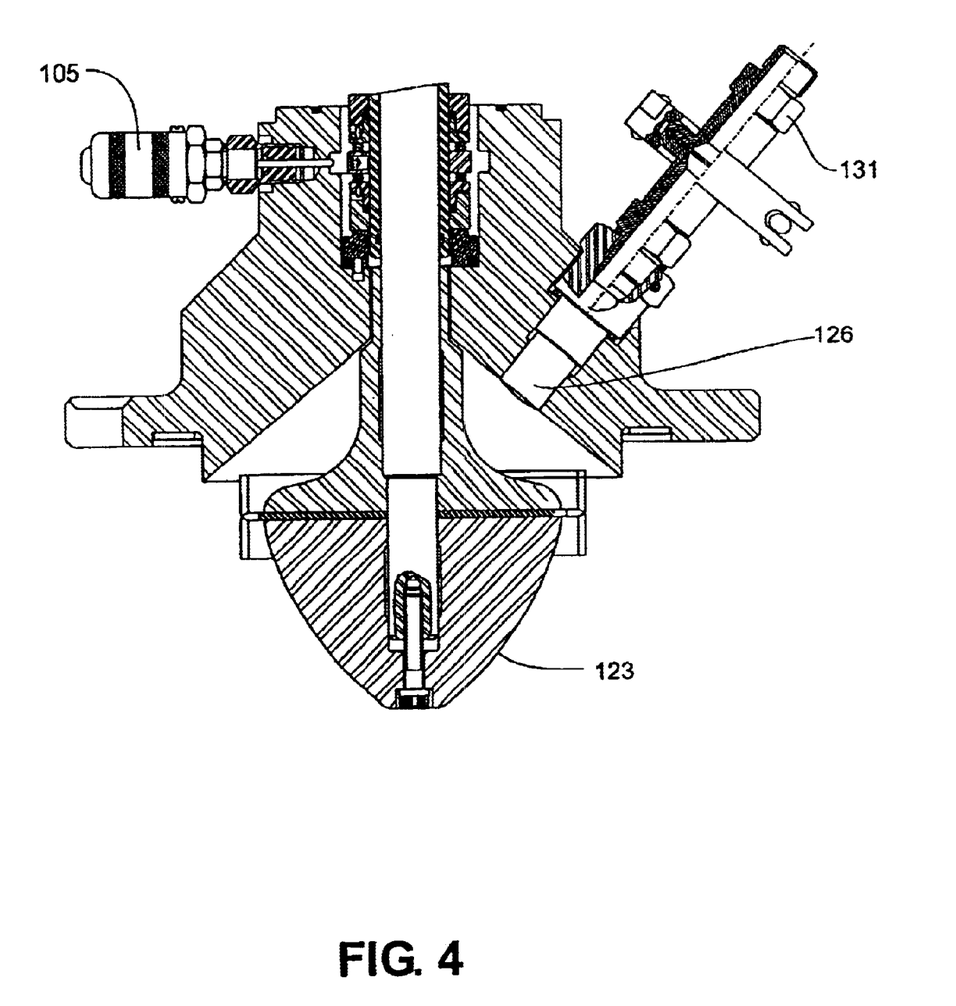
FIG. 4 shows a sectional diagram of an upper portion of the mixing unit of the device according to the present invention.

Motor unit 2, which is shown in greater detail in FIGS. 2 and 3, comprises a three phase electric motor, not shown, which is contained within a motor housing 202, supported on one side by motor carriage 201 and motor support 504 (both shown in FIG. 1), and which is attached at a lower end to a castle 203. The motor has a drive shaft 204 extending downwardly from motor housing 202 into castle 203. The lower end of drive shaft 204 is coupled via an elastic coupling 205 to an impeller drive shaft 101 which, as shown in FIGS. 2 to 4, is coupled at its lower end to an impeller 118.

With reference to FIGS. 2 and 3, a lower end of castle 203 is connected to an upper end of a bearing unit 206. Bearing unit 206 comprises an upper bearing race 207, having combined angular contact bearings 208, and a lower bearing race 209, having combined angular contact bearings 210. Referring to FIG. 2, lower and upper bearing races 207, 209 are held in place by bearing race retainers 211 above and below each of bearing races 207, 209. There is a lubricating oil reservoir 212 extending between the upper end of upper bearing race 207 and below lower bearing race 209. The upper and lower ends of oil reservoir 212 are connected to each other by an oil circulation tube 213. In the lower end of oil reservoir 212 there is a rotor 214 which is attached to impeller drive shaft 101, and which circulates the oil in reservoir 212 via tube 213 when it rotates.

The lower end of bearing unit 206 is attached to a fluid sealing unit 102 of mixing unit 1, for preventing fluid from mixing unit 1 leaking into bearing unit 206, and for preventing lubricating oil from bearing unit 206 from leaking into mixing unit 1. Referring to FIGS. 2 and 3, fluid sealing unit 102 comprises a mechanical seal 103 which consists of a sleeve 104, surrounding impeller drive shaft 101, shaft 101 being rotatable within sleeve 104. In operation, shaft 101 rotates at high velocity causing heating of sleeve 104 which leads to breakdown of the material of the seal. For this reason, sleeve 104 is lubricated and cooled by a suitable fluid, such as monoethileneglicol. Control of the cooling and lubrification of sleeve 104 is achieved using thermo-siphon unit 4, shown in FIG. 1. Thermo-siphon unit 4 is connected to seal unit 102 by tubes 401 and 402. Tube 401 is connected between a cooling fluid outlet 403 in the lower end of thermo-siphon unit 4, and a cooling fluid inlet 105 (shown in FIG. 4) in the lower part of fluid sealing unit 102. Tube 402 is connected between a cooling fluid inlet 404 in the side of thermo-siphon unit 4, and a cooling fluid outlet 106 in the upper part of fluid sealing unit 102. The level of fluid used in lubricating and cooling of mechanical seal 103 is controlled by a capacitative level switch 405 above thermo-siphon unit 4. Circulation of the cooling and lubricating fluid within mechanical seal 103 is controlled by a small centrifugal pump 406. Referring again to FIG. 2, an inspection window 107 provided in the wall of fluid sealing unit 102, at its upper end, is used for checking whether there is any leakage of fluid from sealing unit 102 or bearing unit 206.

Referring to FIGS. 2 and 3, the lower end of sealing unit 102 is connected to an upper portion 108 of a mixing chamber 109. Upper portion 108 of mixing chamber 109 has a conical internal fluid contact surface 110 and has a lower flange wall 111 which, in a closed configuration, is connected, via a sealing gasket 112, to an upper end wall 113 of a lower portion 114 of mixing chamber 109. Lower portion 114 has a hemispherical internal fluid contact surface 115 and has a cylindrical drain 116 at its apex extending vertically downwards therefrom. Drain 116 is connected to a drain tube 116a, shown in FIG. 2, which allows fluid to be drained out of mixing chamber 109.

Impeller drive shaft 101 extends through sealing unit 102 and through an opening 117 in upper portion 108 of mixing chamber 109. In a preferred embodiment of the present invention, drive shaft 101 extends approximately two-thirds of the way into lower portion 114 and has an impeller 118 connected approximately half-way along the length of shaft 101 protruding into mixing chamber 109 through opening 117.

Figure 5:
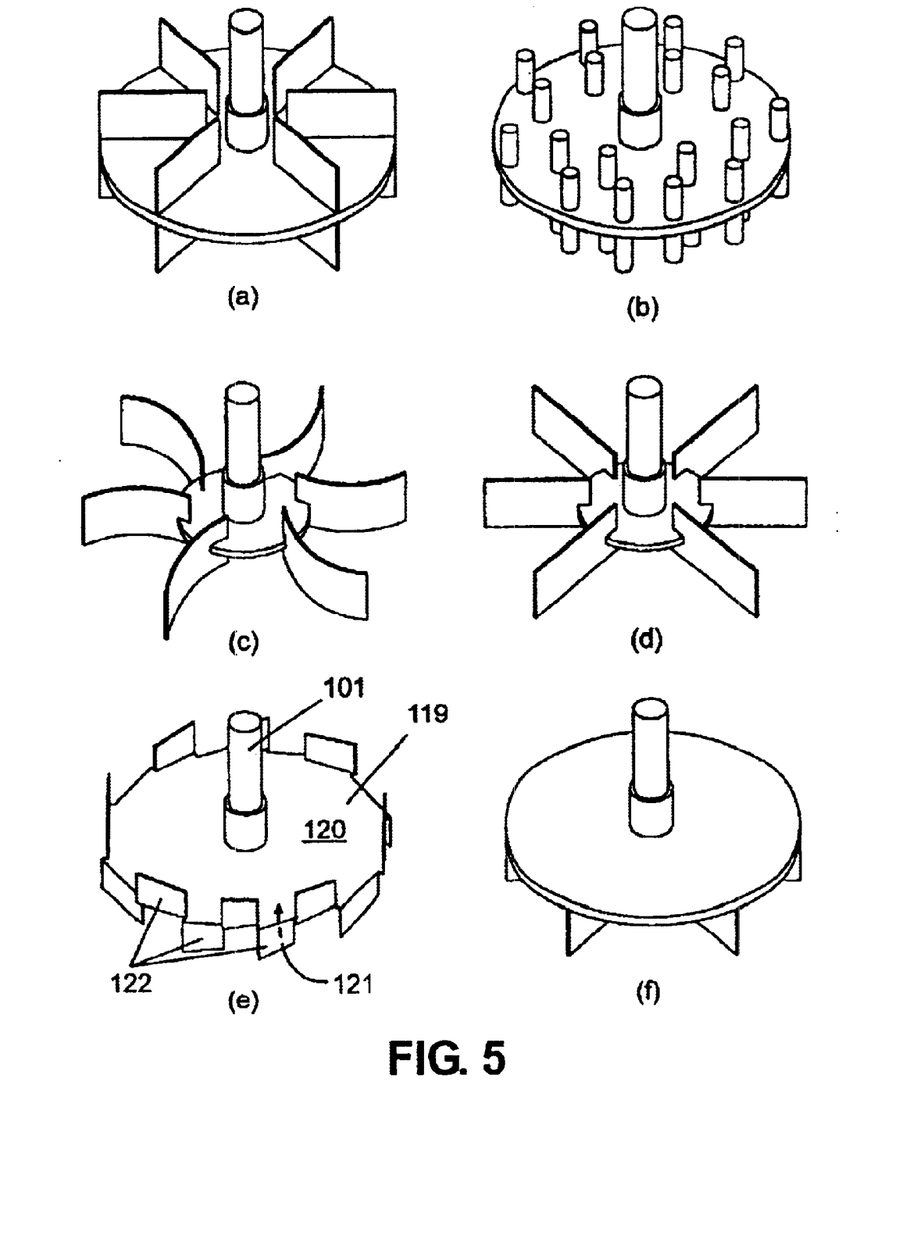

Impeller 118 can have a number of different configurations, some of which are shown in FIGS. 5(a) to 5(f). In the presently preferred embodiment of the present invention the impeller shown in FIG. 5(e) is used. Impeller 118 comprises a circular disc 119 having an upper surface 120 and a lower surface 121, and is attached at its radial center to impeller shaft 101 which extends perpendicularly therethrough. Impeller blades 122 extend from the outer edge of disc 119 alternately from upper and lower surfaces 120 and 121 perpendicuarly to the plane thereof.

When in operation, motor unit 2 rotates impeller shaft 101, and consequently impeller 118, at velocities between 500 and 8000 rpm, depending on the viscosity of the fluids to be mixed in mixing chamber 109. Rotation of impeller 118 creates a turbulent flow of the fluid within mixing chamber 109 in a mixing region, while in a region of mixing chamber 109 above and below impeller 118 there is little or no turbulent mixing. This region is referred to here as the dead volume, and in the device according to the present invention is occupied by a dead volume filler or inner core 123 having a fluid contact surface 123a.

Referring to FIGS. 2 to 4, inner core 123 comprises an upper portion 124, attached to upper surface 120 of impeller disc 119 and configured to fill the dead volume above impeller 118, and a lower portion 125, attached to lower surface 121 of impeller disc 119, configured to fill the dead volume below impeller 118. It should be observed that inner core 123 may also be attached to impeller drive shaft 101, as well as, or instead of, to upper and lower surfaces 120, 121 of impeller disc 119, or as a further alternative may be connected to upper and/or lower portions 108, 114 of mixing chamber 109, so that they do not rotate with impeller 118.

The efficiency of mixer unit 1 is related directly to the mixing capacity of a determined volume of fluid in a certain time, that is the speed with which a particular volume of fluid can be mixed. In the device according to the present invention, due to filling of the dead volume within mixing chamber 109, homogenisation of a mixture of both high and low viscosity fluids (e.g. 2000 cp) can be achieved with efficiency, having a residence time within mixing chamber 109 of only a few seconds.

Upper portion 108 of mixing chamber 109 is provided with a number of through openings 126 perforating and extending perpendicularly outward from internal conical fluid contact surface 110 at spaced intervals therearound. FIG. 2 shows a PT100 temperature sensor 127 fixed in one of through openings 126, and a damper inlet 128 fixed in another of through openings 126. Temperature sensor 127 is used to monitor the temperature of a fluid within mixing chamber 109. Referring to FIG. 1, damper inlet 128 is connected by flexible tubing 301 to hydraulic damper unit 3 which comprises a compressed air reservoir 302. When fluid is being mixed in mixing chamber 109, rotation of impeller 118 produces highly turbulent fluid flow with consequent fluctuations in pressure within chamber 109. In order to damp out such pressure fluctuations, which have an adverse effect on the mixing process, mixing chamber 109 is in direct communication with air reservoir 302 via damper inlet 128 and flexible tubing 301. In this way, fluctuations in pressure within mixing chamber 109 are damped by compression of the air within reservoir 302.

FIG. 3 shows a cleaning fluid injection valve 129 fixed in one of through openings 126, and a principal fluid exit tube 130 fixed in another of through openings 126. Cleaning fluid injection valve 129 is used for cleaning mixing chamber 109 by injecting a mixture of solvent and compressed nitrogen gas therein in order to remove fluid residues from fluid contact surfaces 110 and 115. Cleaning fluid injection valve 129 will be described in greater detail later in this description. Fluid exit tube 130 allows fluid to be fed out of mixing chamber 109.

Referring now to FIG. 4, a fluid sample exit valve 131 is fixed in one of through openings 126, and may be used continuously to collect a sample of the fluid mixed in mixing chamber 109 which can then be fed to a fluid analysis system such as that described in PCT/BR96/00046. In a preferred embodiment of the present invention, when analysis of the fluid exiting from mixing chamber 109 is required, approximately 95% of the total volume of fluid mixed in mixing chamber 109 exits through principal fluid exit tube 130, and the remaining 5% exits through sample exit valve 131.

Again referring to FIGS. 1 and 2, lower portion 114 of mixing chamber 109 is connected via support 503 of support unit 5 so that upper portion 108 of mixing chamber 109 can be moved away from lower portion 114, using motor carriage 201. This allows access to the interior of mixing chamber 109 for maintenance and adjustment purposes.

With reference to FIGS. 2 and 3, lower portion 114 of mixing chamber 109 is provided with a series of through openings 132 which give access to the interior of chamber 109. Fluid injection valves 133 are fixed in through openings 132 and are used to inject the fluids to be mixed, into mixing chamber 109. A further cleaning fluid injection valve 129 is provided in lower portion 114, as shown in FIG. 2, so that thorough cleaning of fluid contact surfaces 110 and 115 of upper and lower portions 108, 114 of chamber 109, and the surfaces 123a of volume filler 123 can be achieved. Referring to FIGS. 2 and 3, a pressure sensor 134 is fixed in one of through openings 132, and is used to measure the pressure within mixing chamber 109. The signal from pressure sensor 134 is analysed by a pressure control means (not shown), which operates an automatic high speed pressure control valve (not shown), to open or close fluid exit tube 130 depending on the pressure in chamber 109.

The approximately hemispherical form of inner surface 115 of lower portion 114 of mixing chamber 109 permits a maximum number of fluid injection valves 129, 133 to have access thereto, and therefore enables a maximum number of fluid ingredients to be injected into mixing chamber 109.

Figure 6:
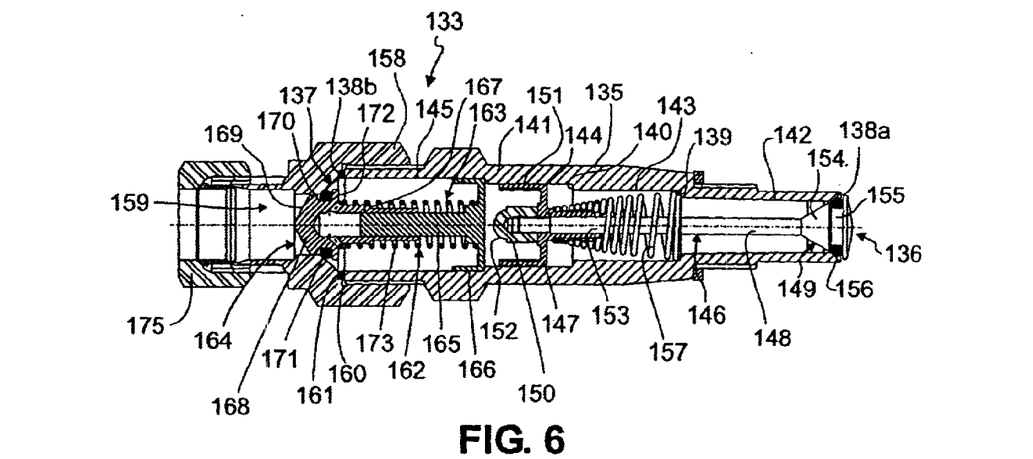
FIG. 6 shows a sectional diagram of a fluid injection valve according to the present invention.

Fluid injection valves 129 and 133 will now be described in detail with reference to FIGS. 6 and 7. Fluid injection valve 133 is shown in FIG. 6, and comprises a cylindrical body portion 135, which is circularly symmetric about a central axis, and has a fluid exit aperture 136 at one end, for allowing fluid to exit from body portion 135, and an access aperture 137 at the opposite end, for allowing access to the internal workings of the valve. The end face 138a of body portion 135 which defines exit aperture 136 is chamfered inwards towards the central axis, and three internal shoulders 139, 140 and 141 are spaced at intervals therefrom along the length of body portion 135, shoulder 139 being the closest to exit aperture 136, and shoulder 141 being furthest therefrom. Internal cylinder walls 142, 143, 144 and 145 extend between end face 138a and shoulder 139, shoulder 139 and shoulder 140, shoulder 140 and shoulder 141, and between shoulder 141 and an end face 138b of body portion 135 respectively. The cylinder formed by cylinder wall 142 has a smaller radius than that formed by cylinder wall 143, which is smaller than that formed by cylinder wall 144, which in turn is smaller than that formed by cylinder wall 145. It should be noted that cylinder walls 143, 144 and 145 are parallel, but that cylinder wall 142 is angled slightly towards exit aperture 136.

Exit aperture 136 of body portion 135 is sealable with an exit aperture seal 146 comprising a seal guide 147, an exit aperture seal shaft 148 and an exit aperture seal head 149. Seal guide 147 comprises a hollow cylindrical body 150 and guide arms 151. When in position within body portion 135 of fluid injection valve 133, the axis of seal guide body 150 corresponds to the central axis of body portion 135. Seal guide body 150 has a closed end 152 facing access aperture 137 and an open end 153 facing exit aperture 136. Guide arms 151 extend radially outwards from the cylindrical wall of guide body 150 and are bent perpendicularly towards access aperture 137 when they reach internal cylinder wall 144 so that guide body 150 is slidable in the cylinder formed between shoulders 140 and 141.

One end of exit aperture seal shaft 148 enters open end 153 of seal guide body 150 and is held therein. The other end of shaft 148 extends towards exit aperture 136 and is fixed to seal head 149 which comprises a frusto-conical shaped stopper 154 having a groove 155 containing an o-ring 156. A conical spring 157 has one end wound around seal guide body 150 between guide arms 151 and open end 153, and the other end butting against shoulder 139. When valve 133 is in its sealed position, spring 157 is compressed slightly so that o-ring 156 butts against end face 138a, part of which comprises a seat for the o-ring, to seal exit aperture 136.

A valve cap 158 is fixed to body portion 135 to partially close access aperture 137. Valve cap 158 is formed with a fluid entrance aperture 159 which, when valve cap 158 is fixed to body portion 135, has its axis along that of the central axis of body portion 135. End face 138b of body portion 135 is sealed against an internal shoulder 160 of valve cap 158 by a gasket 161.

Entrance aperture 159 is sealable by an entrance aperture seal 162 which comprises a guide portion 163 and a seal portion 164. Guide portion 163 comprises a small cylindrical tube 165 which is provided with guide arms 166 at its extremity furthest from access aperture 137. Cylindrical tube 165 has its longitudinal axis corresponding with the central axis of body portion 135 and is held in place by guide arms 166 which extend radially outwards from tube 165 and are bent perpendicularly towards access aperture 137 when they reach cylinder walls 145. Guide arms 166 butt against shoulder 141 to hold guide portion 163 in place within body portion 135.

Seal portion 164 of entrance aperture seal 162 comprises a hollow cylindrical tube 167 and a head 168. Hollow cylindrical tube 167 fits over cylindrical tube 165 of guide portion 163 and is free to move towards and away from entrance aperture 159. Head 168 has a conical end surface 169 which fits inside entrance aperture 159, and has a groove 170 containing an o-ring 171. A shoulder 172 is formed at the junction of cylindrical tube 167 with head 168 and one end of a spring 173 is attached buttingly thereagainst. The other end of spring 173 is wound around cylindrical tube 165 and butts against guide arms 166. When valve cap 158 is attached to body portion 135 of valve 133, spring 173 is compressed sufficiently so that o-ring 171 is pushed against an inner angled surface 174 of valve cap 158, to seal entrance aperture 159.

Valve cap 158 is supplied with a connection nut 175 which is used to connect fluid entrance aperture 159 to either a rigid or flexible tube (not shown) for supplying the fluid to be injected into mixing chamber 109 from a fluid reservoir (not shown).

Referring to FIGS. 2 and 6, in operation with mixer unit 1, valves 133 are fixed in respective through openings 132 in lower portion 114 of mixing chamber 109 so that the exit aperture 136 of each valve 133 lies flush with fluid contact surface 115 thereof.

Normally, the pressure within mixing chamber 109 is maintained at a pressure of 1 Kg cm$^{-2}$ below the pressure in the tubes connected to entrance apertures 159 of valves 133, due to the loss of pressure caused by the action of springs 157 and 173 to hold o-rings 156 and 171 against their respective seats. In order for fluid to be injected into mixing chamber 109, the pressure externally to the entrance apertures 159 of valves 133 is raised so that entrance aperture seal head 168 is pushed into body 135 of valve 133 against the action of spring 173, to break the seal formed between o-ring 171 and surface 174 of valve cap 158, allowing fluid to flow into body portion 135 of valve 133. The resulting rise in pressure of the fluid within valve 133 pushes exit aperture seal head 149 into mixing chamber 109, breaking the seal formed between oaring 156 and end face 138a of body portion 135 of valve 133, allowing fluid to flow into mixing chamber 109. As soon as the pressure externally to entrance aperture 159 is reduced in relation to the pressure exerted by springs 157 and 173, fluid exit aperture seal 146 and fluid entrance aperture seal 162 close to seal respective exit and entrance apertures 136 and 159.

The lower pressure within mixing chamber 109 in relation to that externally thereof ensures that the fluid is injected into mixing chamber 109 smoothly, without spitting, and that fluid does not leak or drip from valves 133 into chamber 109, and the double seal formed by exit and entrance aperture seals 146 and 162 of valves 133 ensures that fluid does not return from mixing chamber 109 into the fluid supply tubes.

Figure 7:
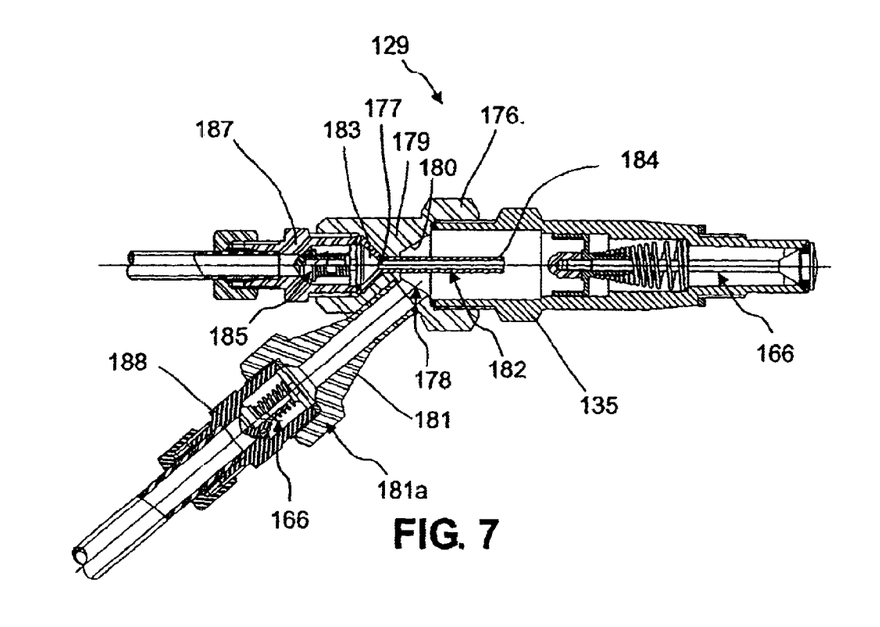
FIG. 7 shows a sectional diagram of a fluid injection valve having two fluid inlets.

Fluid injection valve 129, which may be used for injecting cleaning fluid into mixing chamber 109, is shown in FIG. 7. Valve 129 comprises the same body portion 135 as fluid injection valve 133, having the same fluid exit aperture seal 146 but, does not have a fluid entrance aperture seal held therein. Instead, a valve cap 176 is provided which seals against body portion 135 in the same manner as for valve 133, but instead of forming a single fluid entrance aperture is provided with two entrance apertures 177 and 178. Entrance aperture 177 is formed by a neck portion 179 in valve cap 176 and has its axis corresponding to the central axis of body portion 135. Entrance aperture 178 is formed in an internal frusto-conical shaped wall 180 of valve cap 176 and has a feed tube 181 extending outwardly therefrom at an angle to the central axis of body portion 135, the external end of feed tube 181 being formed with a seal receptacle portion 181*a*. A feed funnel 182, comprising a conical entrance aperture 183 and a feed tube 184, is held within valve cap 176, with feed tube 184 extending through neck portion 179 into body portion 135. Two entrance aperture seals 185 and 186 are held within seal holders 187 and 188, which are fixed within valve cap 176 abutting feed funnel 182 and the external opening of feed tube 181 respectively. Entrance seals 185 and 186 are similar to entrance seal 162 of valve 133.

When used for cleaning mixing chamber 109, compressed nitrogen gas is forced under pressure through feed funnel 182 into valve 129 while at the same time solvent is forced under pressure through entrance aperture 178 of valve 129 and thence through exit aperture 136 into mixing chamber 109. Rotation of impeller 118 in combination with high pressure injection of nitrogen gas and solvent ensures extremely rapid cleaning of the internal surfaces 110 and 115 of mixing chamber 109.

It should be appreciated that the above described invention can be carried out in a variety of different embodiments. For example, mixing of fluid within mixing chamber 109 may be achieved by swirling the fluids to be mixed at high pressure as they enter the mixing chamber. In this case there may be a number of dead volumes within mixing chamber 109, and a series of inner cores 123 may be provided to fill these dead volumes. Also, inner core 123 may be inflatable and deflatable to vary the volume of mixing chamber 109 according to different fluid mixtures having different viscosities and therefore different dead volumes around impeller 118.

Other modifications may be made to fluid injection valves 129 and 133 without going beyond the scope of the present invention. For example, fluid injection valve 129 may be provided with more than two entrance apertures so that more fluids may be injected into mixing chamber 109 through the same injection valve.

Apart from the above mentioned modifications, other changes may be obvious to those skilled in the art and, as such, the scope of the present invention should be limited only by the terms and interpretation of the following claims.

What is claimed is:

1. A fluid mixing device, for the continuous mixing of two or more fluids, comprising:
    a mixing chamber having fluid contact surface means (110, 115, 123*a*) defining an internal chamber region (109);
    at least one fluid inlet means (132) provided in said fluid contact surface means (110, 115), for feeding at least two fluids into said chamber region (109);
    at least one fluid outlet means (130) provided in said fluid contact surface means (110, 115, 123*a*), for feeding fluid out of said chamber region (109);
    fluid mixing means (118) within said chamber region (109), capable of inducing mixing of two or more fluids within a turbulent mixing region;
    characterised in that said chamber region (109) has a configuration which substantially corresponds to the configuration of said turbulent mixing region.

2. A fluid mixing device according to claim 1, characterised in that said mixing chamber (109) comprises an outer fluid containment portion (113, 114) and an inner core (123), a first area (110, 115) of said fluid contact surface means being formed on said fluid containment portion and a second area (123*a*) of said fluid contact surface means being formed on said inner core.

3. A fluid mixing device according to claim 2, characterised in that said first area (110, 115) of said fluid contact surface means has a substantially spherical form.

4. A fluid mixing device according to claim 2, characterised in that said at least one fluid inlet means (132) is provided in said first area (110, 115) of said fluid contact surface means.

5. A fluid mixing device according to claim 2, characterised in that said at least one fluid outlet means (130) is provided in said first area (110, 115) of said fluid contact surface means.

6. A fluid mixing device according to claim 2, characterised in that said at least one fluid inlet (132) means and said at least one fluid outlet means (130) are provided in said first area (110, 115) of said fluid contact surface means.

7. A fluid mixing device according to claim 6, characterised in that said at least one fluid inlet means (132) is located below said at least one fluid outlet means (130).

8. A fluid mixing device according to claim 1, characterised in that said mixing chamber is further provided with pressure control means, for controlling the pressure within said chamber region in relation to the pressure externally of said chamber.

9. A fluid mixing device, for the continuous mixing of two or more fluids, comprising:
    a mixing chamber having fluid contact surface means defining an internal chamber region;
    at least one fluid inlet means provided in said fluid contact surface means, for feeding at least one fluid into said chamber region;
    at least one fluid outlet means provided in said fluid contact surface means, for feeding fluid out of said chamber region;
    fluid mixing means within said chamber region, capable of inducing mixing of two or more fluids within a mixing region;
    characterised in that said chamber region has a configuration which substantially corresponds to the configuration of said mixing region, and
    characterised in that said first area of said fluid contact surface means has a substantially spherical form.

10. A fluid mixing device, for the continuous mixing of two or more fluids, comprising:
    a mixing chamber having fluid contact surface means defining an internal chamber region;
    at least one fluid inlet means provided in said fluid contact surface means, for feeding at least one fluid into said chamber region;
    at least one fluid outlet means provided in said fluid contact surface means, for feeding fluid out of said chamber region;
    fluid mixing means within said chamber region, capable of inducing mixing of two or more fluids within a mixing region;
    characterised in that said chamber region has a configuration which substantially corresponds to the configuration of said mixing region, and
    characterised in that said at least one fluid outlet means is provided in said first area of said fluid contact surface means.

11. A fluid mixing device, for the continuous mixing of two or more fluids, comprising:
- a mixing chamber having fluid contact surface means defining an internal chamber region;
- at least one fluid inlet means provided in said fluid contact surface means, for feeding at least one fluid into said chamber region;
- at least one fluid outlet means provided in said fluid contact surface means, for feeding fluid out of said chamber region;
- fluid mixing means within said chamber region, capable of inducing mixing of two or more fluids within a mixing region;
- characterised in that said chamber region has a configuration which substantially corresponds to the configuration of said mixing region, and
- characterised in that said at least one fluid inlet means and said at least one fluid outlet means are provided in said first area of said fluid contact surface means.

* * * * *